UNITED STATES PATENT OFFICE.

PAUL HOERING, OF BERLIN, GERMANY.

PROCESS OF MAKING A SOLUBLE COMPOUND OF IRON-GLYCERO-PHOSPHATE COMBINED WITH MILK OR MILK-ALBUMIN.

1,027,844.

Specification of Letters Patent.   Patented May 28, 1912.

No Drawing.   Application filed July 7, 1911.   Serial No. 637,243.

*To all whom it may concern:*

Be it known that I, PAUL HOERING, residing at Ahornstrasse 2, Berlin, Germany, have invented certain new and useful Improvements in Processes of Making a Soluble Compound of Iron-Glycero-Phosphate Combined with Milk or Milk-Albumin, of which the following is a specification.

This invention relates to an improved process of making a soluble compound of iron-glycero-phosphate intimately combined with milk or milk albumin.

I have already disclosed in the British Patent, No. 16,152 of 1907, heretofore obtained by me, that valuable soluble iron-casein compounds which contain in addition to masked iron glycero-phosphate intimately combined with casein, can be obtained when casein is dissolved in an alkali and the solution obtained thereby mixed with a corresponding quantity of iron glycero-phosphate. Now I have found that such iron-albumin compounds can be made very simply, cheaply and inexpensively by proceeding directly from the milk and mixing the same according to its percentage of albumin with iron-glycero-phosphate. In this case also, just as with the casein-alkali solution, a conversion to iron-glycero-phosphate-casein occurs, which could not be foreseen. A milk of agreeable taste and but little changed in color is obtained, which, when unskimmed milk is employed, contains all the constituents of the milk and, in addition, iron-glycero-phosphate which is intimately combined with the milk-albumin. The product is a readily assimilable iron-albumin compound which is of great physiological and therapeutic value, as it contains, in addition to the albumin of the milk, the valuable iron-glycero-phosphate intimately combined therewith. The compound of milk and iron-glycero-phosphate thus obtained can be brought into stable form by sterilization or inspissation. When inexpensive skimmed milk is used and evaporated to dryness after the addition of the iron-glycero-phosphate, for instance, by allowing the same to run over highly-heated rolls, a yellowish white powder is obtained which dissolves readily in water with milky turbidity. In this manner a cheap and exceedingly readily assimilable nutrient in a stable and convenient form is obtained, which contains the unchanged constituents of the milk and also, particularly, the proper percentage of masked iron and glycero-phosphate, both intimately combined with the milk-albumin. As compared with other iron-preparations, this preparation is advantageously distinguished therefrom by its agreeable taste.

My improved process represents a considerable improvement over the well known processes of making iron-casein compounds, as it is no longer necessary first to separate the casein in an insoluble form, then dissolve it by adding alkali, and then obtain the soluble iron-albumin compounds by adding iron-salts. It is of great importance that in the compounds prepared according to the present invention, the albumin-molecule is present in an unchanged form. It is well known that the proteins are changed by coagulation, for instance, by adding acids or ferments to the milk, not only with regard to their molecular composition, but also by the loss of their physiological properties, such as their capability of being readily digested and assimilated.

My present process enables compounds of casein and iron-glycero-phosphate to be made in a water-soluble form without, as in the process heretofore disclosed by me, passing them through an insoluble form, whereby all the intermediate operations and all the changes in the albumins caused thereby are avoided.

Though milk has heretofore been mixed with solutions of sodium-glycero-phosphate placed on the market in this form, the compounds which were obtained according to my process, differ very materially therefrom inasmuch as according to my invention, simple mixtures or emulsions are not formed, but, in consequence of the conversion, the iron-glycero-phosphate is intimately combined with the albumin-molecule whereby the great physiological and therapeutic value of the compounds is obtained.

The preparation according to my invention may be employed either alone, or mixed with cocoa and the like, as a nutrient and strengthening agent which can be readily absorbed.

Example: 100 liters of skimmed milk are mixed, preferably after being neutralized by an admixture of alkali or alkaline salts, with a quantity of preferably freshly made iron-glycero-phosphate corresponding either to the percentage of albumin or to the neutral calcium salt of the same. As skimmed milk contains six-sevenths parts of casein, and one-seventh part of globulin and albumin, it is only necessary to consider the contents of casein and combine it with the equivalent quantity of iron-glycero-phosphate so as to form with the casein a neutral salt. As the average percentage of casein in skimmed milk is 3%, it is necessary to add for 100 liters of milk the equivalent quantity of iron-glycero-phosphates, namely 282 grams dissolved in about 3 liters of water. By evaporating the solution to dryness, a yellowish white powder of agreeable odor and taste is obtained.

I claim:

1. The herein described process of making soluble compounds of milk and milk-albumin, which consists in mixing milk with iron-glycero-phosphate, and evaporating the solution thus obtained to a dry powder.

2. The herein described process of manufacturing soluble iron-milk preparations, which consists in mixing milk with a quantity of iron-glycero-phosphate equivalent to the percentage of albumin in the milk, and then evaporating the solution to a dry powder.

In testimony whereof I affix hereunto my signature in presence of two witnesses.

PAUL HOERING.

Witnesses:
  ERNEST ENTENMANN,
  FRIDA KLEIBER.